United States Patent Office 3,539,291
Patented Nov. 10, 1970

3,539,291
PREPARATION OF STARTING MATERIALS FOR PHOSPHATE PHOSPHORS
Vincent Chiola and Clarence D. Vanderpool, Towanda, Pa., assignors to Sylvania Electric Products Inc., a corporation of Delaware
No Drawing. Filed Dec. 6, 1967, Ser. No. 688,362
Int. Cl. C01h 25/32; B01j 17/04
U.S. Cl. 23—109
3 Claims

ABSTRACT OF THE DISCLOSURE

The preparation of dibasic calcium, strontium or cadmium hydrogen phosphate can be produced by forming a solution of the corresponding monobasic phosphate and acidifing the solution with mineral acid ions and heating the solution from 60 to 100° C. A nucleating agent, such as ethyl alcohol, can be used to increase the rate of precipitation.

BACKGROUND OF THE INVENTION

Field of the invention

This invention relates to the preparation of starting materials for fluorescent phosphors and particularly to those which can be used for the manufacture of certain divalent metal phosphate phosphors from one or more corresponding dibasic phosphates.

Description of the prior art

Divalent metal phosphate phosphors are known to the art and many methods have previously been devised for the preparation of starting materials for them. Furthermore, it is known that for optimum brightness, the starting materials should have particle sizes lying within narrow limits so that the phosphor subsequently prepared will have similar particle sizes. If the particles of starting materials are too large, the particle size of the resulting phosphor will also be too large and hence the phosphor will have to be ground. However grinding not only reduces the size of the large particles but, also reduces smaller particles thus introducing so called superfines which are quite undesirable as pointed out in the U.S. patent to Homer et al. No. 2,962,616.

We have found that a highly crystalline, non-agglomerated, anhydrous, dibasic calcium, strontium or cadmium hydrogen phosphate may be prepared by heating an acidified solution of the correspondinng monobasic phosphate to a temperature within the range of 60° C. and its boiling point in the presence of nitrate or chloride ions. The solution of monobasic phosphate can be prepared by either dissolving it in water or admixing materials which react to form the monobasic phosphate. Preferably a nucleating agent, generally a water soluble alcohol such as ethyl alcohol, is added to the solution. In accordance with our method, the dibasic strontium, calcium or cadmium hydrogen phosphate which is produced has a narrow particle size distribution and characteristic diamond crystal habit.

In the prior art, luminescent grade dibasic calcium hydrogen phosphate had been prepared by mixing solutions of calcium chloride and diammonium phosphate together. The resulting precipitated material was usually highly agglomerated and exhibited poor crystallinity and particle size distribution. Furthermore, the material frequently contained impurities of calcium hydroxylapatite which were quite undesirable because they did not react to form a luminescent phosphor.

Accordingly, the primary object of our invention is the preparation of non-agglomerated, anhydrous, dibasic calcium, strontium or cadmium hydrogen phosphate having a characteristic diamond-shaped crystal habit.

And corresponding to the primary object of our invention is yet another object which is to prepare anhydrous dibasic calcium, strontium or cadmium hydrogen phosphate having desirable properties for use in the preparation of luminescent grade phosphate phosphors.

A feature of this invention is the precipitation of anhydrous dibasic calcium, strontium or cadmium hydrogen phosphate from a monobasic calcium, strontium or cadmium hydrogen phosphate solution by heating to a temperature between 60° C. and the boiling point of the solution in the presence of a mineral acid.

The many other objects, features and advantages of the instant invention will become manifest of those conversant with the art upon reading the following specification wherein the preferred embodiments of our invention is shown and described by way of illustrative examples.

As we have stated, the present invention relates to preparing highly crystalline, non-agglomerated anhydrous dibasic calcium, strontium or cadmium hydrogen phosphate having a narrow size distribution and a characteristic diamond crystal habit. We have found that the product of our invention can be crystallized from a solution of monobasic calcium, strontium or cadmium hydrogen phosphate by heating an acidified solution to temperatures between 60° C. and the boiling point in the presence of the nitrate or chloride ions in order to obtain a definite crystal habit. Suitable sources of the nitrate ions are nitric acid or alkaline earth nitrates. Hydrochloric acid and corresponding alkaline earth chlorides may be used however, consistent and reproducible non-agglomerated dibasic calcium, strontium and cadmium hydrogen phosphate crystals are not always obtained. Precipitation in the presence of organic acids such as formic or oxalic is unsatisfactory because the product recovered has an irregular shape, is excessively agglomerated and has a wide distribution of particle size. We have found that the solutions of monobasic calcium, strontium or cadmium hydrogen phosphates should be from 0.4 to 0.7 molar calculated as phosphoric acid, when no nucleating agent is added. At concentrations higher than 0.7 molar, precipitation even by heating the solution to boiling is almost impossible. The nitrate ion concentration may range from 0.004 to 0.2 molar and preferably is added as nitric acid. Here also, concentrations greater than 0.2 molar inhibits precipitation. Although at concentrations of monobasic calcium, strontium or cadmium hydrogen phosphates less than 0.4 molar (calculated as phosphoric acid) and nitric acid concentrations less than 0.004 molar, precipitation of anhydrous products occur; it is agglomerated and has a wide particle size distribution.

An important feature of our invention is the use of a water soluble alcohol, preferably ethyl alcohol, to induce nucleation and crystallization of the MHPO₄ (where M is a metal selected from the group consisting of calcium, strontium and cadmium) and obtain higher yields. In practice, the upper limit of the quantities of monobasic calcium, strontium and cadmium hydrogen phosphate which may be placed into solutions may be extended appreciably by using alcohol to initiate nucleation. In particular, the concentrations can be raised up to about 1.0 molar and even up to as high as 1.3 molar solutions, however even at the upper limits, the yield of MHPO₄ will decrease to some extent. For calcium precipitation the amount of alcohol which we prefer to use is 5 to 11% by weight of the solution. We have discovered that for strontium precipitation, greater quantities of alcohol should be used generally ranging up to 60% by weight although quantities of 25 to 55% are preferable. Quantities greater than the aforesaid limits tend to be wasteful while lesser quantities do not induce nucleation at the limits of strontium, calcium or cadmium hydrogen phosphate concentrations.

In Table I, following we outline certain of the physical measurements of the CaHPO₄ particles of our invention (Samples 2 and 3). The prior art methods of forming the CaHPO₄ (Samples 4 and 5) produce a material which has a much smaller average particle size than that which is produced according to our invention. A difference of approximately 6 microns occurs when our procedure is used rather than the procedure of the prior art. Of course since the average particle size of the prior art method is smaller than that which is produced according to our invention, the bulk density of the material of the art will be similarly smaller. When using the method of the prior art, there were substantially no particles above 20 microns in diameter whereas in the method according to our invention, the large bulk of the particles are centered about a range between 9 and 32 microns. Of course, there were some smaller particles and some larger, however their quantities were not so great as to be substantially deleterious to phosphor preparation.

Example II.—The process is similar to that given in Example I except that the temperature of the solution is allowed to rise to 86–88° C. before filtering and washing for recovery of CaHPO₄. Particle size as measured by Fisher Sub-Sieve Sizer is 13.5 microns, and bulks density is 7.6 g./in.³. X-ray examination shows the product to be pure CaHPO₄. The geometric mean diameter, calculated from Photelometer particle size distribution data, is 20 microns. A Ca/P ratio as calculated from analytical data is 0.996.

Example III.—105.8 g. of technical grade strontium nitrate, $Sr(NO_3)_2$, was dissolved in 500 ml. of $H_2O$ to make a 0.5 molar solution, 17.4% by weight solids, solution. To this was added a phosphoric acid solution containing 49 g. of reagent phosphoric acid (85% by weight, equivalent to 41.6 g. anhydrous $H_3PO_4$) in 500 ml. deionized water. This is 0.43 molar with respect to 100% $H_3PO_4$. A monobasic strontium hydrogen phosphate solution was attained. Boiling this solution produced no precipitate. The solution was evaporated to ½ volume and cooled to 50° C. without causing precipitation of any product. Addition of 1000 ml. ethyl alcohol, specific gravity=0.82, caused formation of a haze at 50° C. Heating to 80° C. caused increased haziness and precipitation of a product. The amount of alcohol required was 1000 ml., or 820 g., equivalent to 55% by weight of the solution. A higher concentration of alcohol is required in this example than was specified for precipitation of the CaHPO₄.

The product was filtered on a Buchner funnel, washed with 2 liters of hot deionized water (75° C.) and dried 60–65° C. in a steam oven overnight (15 hours).

The particle size as measured by the Fisher Sub-Sieve Size was 9.8 microns and the bulk density is 9.55 g./in.³. X-ray examination showed the product to be greater than 90% SrHPO₄ with a quantity less than 10% β-SrHPO₄. Microscopic examination showed a highly crystalline product having a hexagonal habit.

Example IV.—To a 0.5 molar aqueous solution of $Cd(NO_3)_2$ there was added a 0.43 molar solution of phos-

TABLE I

| Material CaHPO₄ | Average particle size, microns | Bulk density, g./in.³ | Photelometer size distribution, percent by weight | | | |
|---|---|---|---|---|---|---|
| | | | 0–9 microns | 0–20 microns | 20–32 microns | 32–36 microns |
| Sample 2 | 13.5 | 7.6 | 1.99 | 41.01 | 43.09 | 14.51 |
| Sample 3 | 11.2 | 7.0 | 5.5 | 51.25 | 32.59 | 9.68 |
| Sample 4 | 6.0 | 6.0 | 38 | 46 | 9 | 2 |
| Sample 5 | 6.0 | 6.7 | 84 | 16 | | |

The following examples are illustrative of the steps of our invention however we do not intend these examples to be limitative upon the claims.

Example I.—Glass-lined equipment is used throughout. The agitator is covered with polyethylene.

Fifty-seven gallons of a solution of monobasic calcium-hydrogen phosphate which is 0.20 molar in calcium, 0.63 molar in phosphoric acid is mixed with three gallons 0.043 molar nitric acid solution in a 60-gallon glass-lined tank. For each run or batch crystallization, eight gallons of this solution are pumped into a 10-gallon, steam jacketed kettle. Denatured ethyl alcohol is added when the contents of the kettle reaches 50–55° C. The temperature continues to rise during alcohol addition to 60–65° C. After 5–7 pounds of alcohol are added, the temperature is raised to 81° C. to precipitate the CaHPO₄. At this point, the product is filtered hot and washed with deionized water in the conventional manner. The particle size of the product as measured by Fisher Sub-Sieve Sizers is 11.2 microns and bulk density of 7.0 g./in.³. X-ray examination shows the product to be essentially pure CaHPO₄ with a possible trace of $Ca_3(PO_4)_2 \cdot H_2O$. The geometric mean diameter as derived from Photelometer particle size distribution data is 17 microns. Ca/P ratio of the product, calculated from analytical data, is 1.006.

phoric acid (on basis of anhydrous $H_3PO_4$). A monobasic strontium hydrogen phosphate solution was attained. Boiling the solution did not produce a precipitate; neither did evaporation to ½ volume and cooling to 50° C. Addition of ethyl alcohol, specific gravity=0.82 produced a slight haze at 50° C. Heating to 80° C. caused haziness and precipitation of the dibasic cadmium hydrogen phosphate. 1000 ml. or 820 g. of the alcohol was required to obtain precipitation. This is equivalent to about 55% by weight of the original solution. Again a high concentration of alcohol is required than is used in precipitating CaHPO₄. After recovering the product by filtration, it was dried in a steam-heated oven at 60–65° C.

The product was identified as a pure form of $$Cd_5H_2(PO_4)_4 \cdot (H_2O)_4$$

identical to the product previously characterized by X-ray diffraction. Microscopic examination showed a highly crystalline product having rectangular habit. Absolute density of the material was 4.09. Particle size by Fisher Sub-Sieve Sizer was 25–26 microns.

It is apparent that modifications and changes may be made within the spirit and scope of the instant invention, but it is our intention however only to be limited by the scope of the appended claims.

As our invention, we claim:

1. In the process of preparing a dibasic hydrogen phosphate having at least one cation selected from the group consisting of calcium, strontium and cadmium the steps for improving the crystal habit and particle size distribution which comprise: forming a mineral acid ion containing, acidified solution of a monobasic hydrogen phosphate having at least one of said cations in concentrations between about 0.4 and 1.3 molar calculated as phosphoric acid, heating said solution and adding greater than 5% by weight of a water soluble alcohol nucleating agent; precipitating the corresponding dibasic hydrogen phosphate.

2. The process according to claim 1 wherein the mineral acid ion is nitrate ion in concentration between about 0.004 to 0.2 molar.

3. The process according to claim 1 wherein the nucleating agent is ethyl alcohol.

References Cited

UNITED STATES PATENTS

| | | | |
|---|---|---|---|
| 2,021,527 | 11/1935 | Suchy et al. | 23—109 |
| 3,245,777 | 4/1966 | Chang | 71—39 |

OSCAR R. VERTIZ, Primary Examiner

H. S. MILLER, Assistant Examiner

U.S. Cl. X.R.

23—300, 304